US008312500B2

(12) United States Patent
Emerson et al.

(10) Patent No.: US 8,312,500 B2
(45) Date of Patent: Nov. 13, 2012

(54) SYSTEM AND METHOD FOR SOCIAL NETWORK CHAT VIA A SET-TOP BOX

(75) Inventors: David Emerson, Overland Park, KS (US); Kelsyn Rooks, Overland Park, KS (US); Gary W. LaFreniere, Olathe, KS (US)

(73) Assignee: Century Link Intellectual Property LLC, Denver, CO (US)

( * ) Notice: Subject to any disclaimer, the term of this patent is extended or adjusted under 35 U.S.C. 154(b) by 352 days.

(21) Appl. No.: 12/625,721

(22) Filed: Nov. 25, 2009

(65) Prior Publication Data

US 2011/0126258 A1    May 26, 2011

(51) Int. Cl.
*H04N 7/173* (2011.01)
*H04N 5/445* (2011.01)
*H04N 7/16* (2011.01)

(52) U.S. Cl. ........... 725/131; 725/37; 725/110; 725/139

(58) Field of Classification Search ........................ None
See application file for complete search history.

(56) References Cited

U.S. PATENT DOCUMENTS

| | | | | |
|---|---|---|---|---|
| 7,587,462 | B2 * | 9/2009 | Zmudzinski et al. | 709/207 |
| 7,870,216 | B2 * | 1/2011 | Patron et al. | 709/208 |
| 2003/0078972 | A1 * | 4/2003 | Tapissier et al. | 709/204 |
| 2005/0262542 | A1 * | 11/2005 | DeWeese et al. | 725/106 |
| 2006/0140169 | A1 * | 6/2006 | Soundararajan | 370/352 |
| 2007/0169165 | A1 | 7/2007 | Crull et al. | |
| 2008/0098313 | A1 | 4/2008 | Pollack | |
| 2008/0168491 | A1 * | 7/2008 | Carlson et al. | 725/33 |
| 2009/0293079 | A1 * | 11/2009 | McKee et al. | 725/10 |
| 2010/0199340 | A1 * | 8/2010 | Jonas et al. | 726/8 |

OTHER PUBLICATIONS

Hansell, Saul, "Inaugurating Social TV", The New York Times, Jan. 20, 2009 (2 pages).

* cited by examiner

*Primary Examiner* — Kristine Kincaid
*Assistant Examiner* — Chris Parry
(74) *Attorney, Agent, or Firm* — Patton Boggs LLP

(57) ABSTRACT

A system and method for chatting between a set-top box and one or more social networks. One or more social networks is associated with a set-top box. User preferences are set for communications with one or more contacts included in the one or more social networks. A chat interface is displayed to a user on a display associated with the set-top box in response to the user preferences and activity trigger determined in response to activity detected by the set-top box. Communications occurs with the one or more contacts using the chat interface.

15 Claims, 6 Drawing Sheets

FIG. 6

| User Interface 600 |
|---|

602 Account Number 1234567

Username: testuser

Password: ********

---

604

Chat Permissions for Contacts

- [E] Chet Morton    Facebook – chmorton   7-10 p.m.
- [T] Red Sox Fan Group    Twitter - @Rdsxfans   ESPN channels only
- [C] Shane    MySpace – ss7rules@yahotmail.com
- [C] Spousy    Facebook - cleeprk

---

606

User Preferences

- [✓] Prompt the user when activating the chat interface?
- [✓] Prompt the user when viewing media content simulatenously?
  - [✓] Content allowed: Red sox games, movies and financial reports?
  - [✓] Utilize picture-in-picture for the chat interface and partitions based on the number of chats implemented simultaneously
- [✓] Restrict chatting based on time of day: 7-10 p.m.; rating: G-PG-13
- [ ] Display viewing history?
- [✓] ENABLE ADVANCED OPTIONS
  - [✓] Allow authorized contacts to power on set-top box and display?
  - [ ] Require ____ contacts viewing a program to initiate the chat interface

SYSTEM AND METHOD FOR SOCIAL NETWORK CHAT VIA A SET-TOP BOX

BACKGROUND

The use of and development of communications has grown nearly exponentially in recent years. The growth is fueled by larger networks with more reliable protocols and better communications hardware available to both service providers and consumers. In many cases, social networking websites that encourage individual and group communications and share user posted content are being utilized by increasing numbers of users.

Many communications and entertainment systems are growing together as people expect services that are more intuitive and integrated with their day-to-day life. Some media and communications systems, devices, features, and services have not kept pace as well with the growth experienced by sections of the communications industry.

SUMMARY

One embodiment provides a system and method for chatting between a set-top box and one or more social networks. One or more social networks is associated with a set-top box. User preferences are set for communications with one or more contacts included in the one or more social networks. A chat interface is displayed to a user on a display associated with the set-top box in response to the user preferences. Communications occurs with the one or more contacts using the chat interface.

Another embodiment provides a set-top box for chatting through a social network. The set-top box may include a network interface enabling a user to communicate with one or more contacts through one or more social networks through a communications connection. The set-top box may further include a chat engine in communication with the network interface. The chat engine may be operable to manage communications with the one or more contacts based on user preferences. The chat engine may be operable to display a chat interface to the user.

BRIEF DESCRIPTION OF THE DRAWINGS

Illustrative embodiments of the present invention are described in detail below with reference to the attached drawing figures, which are incorporated by reference herein and wherein:

FIG. 6 is a pictorial representation of a user interface for setting user preferences in accordance with an illustrative embodiment.

DETAILED DESCRIPTION OF THE DRAWINGS

Illustrative embodiments of the present invention provide a system, method, and interface for implementing communications through one or more social networks utilizing a set-top box. The chat interface may be displayed to a user automatically or based on pre-set user preferences. For example, the chat interface may be activated based on specified types of activity specified by the user preferences.

Figure 1:
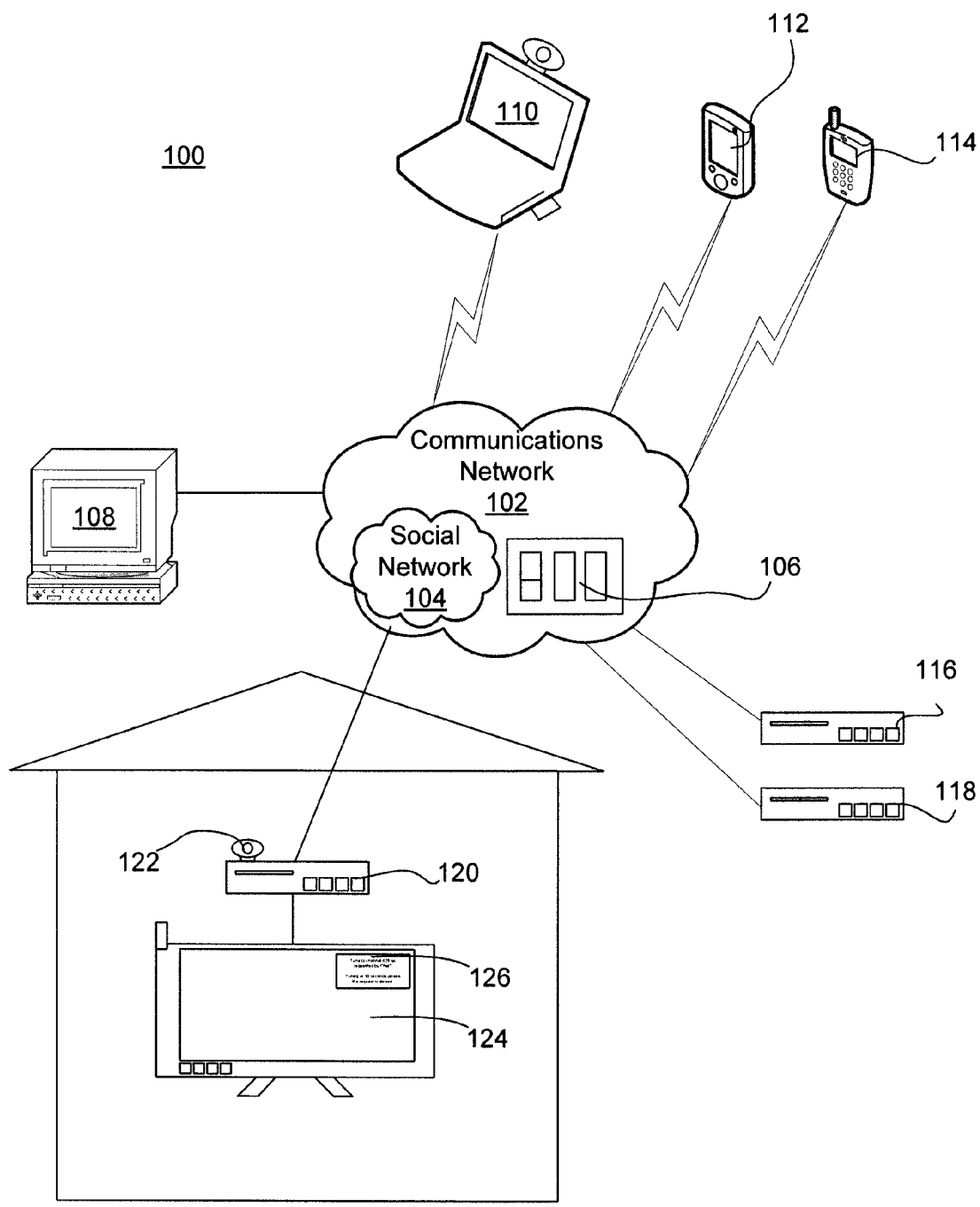
FIG. 1 is a pictorial representation of a communications environment in accordance with an illustrative embodiment.

FIG. 1 is a pictorial representation of a communications environment in accordance with an illustrative embodiment. FIG. 1 shows one possible configuration of a communications environment 100. The communications environment 100 is any number or combination of communications and media systems, equipment, devices, users, providers, networks and other elements that may view, monitor, or integrate communications of a set-top box device or system with one or more networks including social networks. The communications environment 100 may include any number of elements including, but not limited to a communications network 102, a social network 104, a communications management system 106, a client 108, a laptop 110, wireless devices 112 and 114, set-top boxes 116, 118, and 120, a display interface 122, display 124, and an indicator 126.

Communications within the communications environment 100 may occur on any number of networks which may include wireless networks, data or packet networks, cable networks, satellite networks, private networks, and publicly switched telephone networks (PSTN). The communications network 102 represents the different types of communication network types and configurations. In particular, the communications network 102 may be utilized to communicate with the social network 104 directly or through a data connection to one or more parts of the Internet. The features of the embodiments may be implemented by one or more elements of the communications environment 100 independently or as a networked implementation.

The communications environment 100 may further include any number of hardware and software elements that may not be shown in the example of FIG. 1. For example, the communications environment 100 may include exchanges, switches, antennas, towers, switching centers, routers, application servers, media servers, service brokers, call agents, edge routers, gateways (signaling, trunking, access, sub, etc.), IP network service providers, adapters, exchanges, switches, users, and networks.

In one embodiment, the communications networks, service providers, and social networks of FIG. 1 may represent distinct or separate entities that provide or perform any number of connections or services for users that are integrated or communicate with each. For example, the communications network 102 may be a nationwide communications service provider providing analog, digital, voice over internet protocol (VoIP), wireless data and other communications services and features to millions of users. In another example, the communications network 102 may represent a regional provider that represents a much smaller region but similarly provides services to users that communicate with the communications network 102.

The communications management system 106 is one or more devices utilized to enable, initiate, route, and manage media, voice, and data communications between one or more communications devices. The communications management system 106 may include one or more devices networked to manage the communications network 102. For example, the communications management system 106 may include any number of servers, routers, switches, or advanced intelligent network devices. The communications management system 106 may perform a portion of the features and methods herein described. The communications network 102 sends and receives the electronic signals through any number of transmission mediums. The communications network 102 may include various fiber optics, cables, transceivers, interfaces, transmission towers, antennas, or other elements for transmitting communications to the connected communications devices.

The set-top box 120 is a conversion device operable to format media content for display by one or more televisions or other similar displays. In particular the set-top box 120 may be a device configured to decode a satellite, cable, fiber optic, Internet protocol, or other signal, convert and format the signal for display by the display 124, and then communicate the reformatted signal to the display 124 for display to the user. The set-top box 120 may include a digital video recorder (DVR) or personal video recorder (PVR) operable to store media content, applications, past communications, files, data, information, text and other data elements for display as selected by the user.

In one embodiment, viewing selections, historical preferences, a status, or other information, data, or files may be uploaded to a social networking site from the set-top box 120 without the user explicitly or directly accessing the social network (i.e. utilizing a computer, browser and Internet connection). For example, a social network application stored or executed by the set-top box 120 may implement the uploads and downloads from the social networks or contacts. In one embodiment, the illustrative embodiments may allow television viewing and social network to come together in a single real-time interface.

In one embodiment, the DVR may periodically check for new social networking content associated with one or more registered users. The new content, entire pages, or postings may be stored to the DVR to duplicate the user's standard interfaces on the applicable social network. The content may be accessed by a user to off-line or online as selected by the user. Similarly, the set-top box 120 may download viewing information for the user's contacts. For example, the viewing information may include media content currently being viewed, recommendations, highest rated content, historical viewing preferences, and other similar information. The viewing information may include links that tune the set-top box directly to the specified media content, download the media content, indicate a playback time available to the user, or otherwise make available or provide information regarding the media content.

The display 124 is a visual, audio, and/or tactile output device for communicating the media content to a user. For example, the display 124 may be a television, radio, Braille pad, computer, monitor, projector, speakers, and other similar media interface devices. The display 124 and the set-top box 120 may communicate through any number of interfaces, cables, or wired or wireless connections. Although the display 124 and associated user interfaces are referred to in terms of viewing, the display 124 may be enabled to interact with any of the users available senses.

The set-top box 120 may be connected to or communicate with one or more service providers, networks, connections, other users and communications systems, equipment and devices. The social network 104 may or may not be integrated with the communications network 102. In one embodiment, the social network 104 is accessible to customers and users of the communications network 102 directly or to external users through additional connections or networks. The social network 104 is a website or network that focuses on building online or virtual communities of people with a shared interest or activities thereby fostering communication. The social network 104 may include websites, such as Facebook, MySpace, Twitter, Digg and any number of other social networks that are privately or publicly available.

The various devices, systems and equipment of the communications environment 100 may be configured to communicate with the social network 104 and/or the communications management system 106. As a result, a chat interface of the set-top box 120 may allow chatting and other communications with and from a user of the set-top box based on input, feedback or interactions received from one or more contacts utilizing the client 108, laptop 110, wireless devices 112 and 114 or set-top boxes 116 and 118. Similarly any number of other communications devices may access the social network 104 through a locally installed application, portal, webpage or other interface. As previously described, any of the communications devices of the communications environment 100 may include hardware, such as digital logic, chipsets, or applications that are configured to interface with the social network 104 in order to perform the various processes and features herein described. For example, the wireless device 112 may have a locally stored application that allows a user to initiate or receive chat communications with the user of the set-top box 120.

The set-top box 120 may be particularly suited for chat communications and discussion regarding media content because of the information and details that may be available through the set-top box. In one embodiment, a channel may be associated with a social network, one or more contacts, or other social networking elements for enabling chat communications when the user selects the corresponding channel. For example, the user may dedicate channel 118 to Facebook, channel 119 to Twitter, and channel 120 to Snow Skiers Anonymous. As a result, the user may access a home page, wall, or chat interface specific to the designated social networking site by selecting to the pre-configured channel. In one embodiment, the application executed by the wireless device 112 may require authentication, a password or other identifier before sending the command through the communications network 102, social network 104 and/or communications management system 106 to the set-top box 120.

In one embodiment, selections or communications by a contact may be sent directly from a device, such as the wireless device 114 to the set-top box 120 with or without passing through the communications network 102. For example, the wireless device 114 may communicate directly with the set-top box 120 through a Bluetooth, Wi-Fi or cellular data signal to chat. As a result, the set-top box 120 may include one or more transceivers operable to receive internet protocol (IP), wireless communications, and other forms of communication.

In another embodiment, the contacts may provide input through their respective set-top boxes 116 and 118 in order to chat with the set-top box 120 or send files, data, text, links, or other information. For example, utilizing a television and remote control linked with the set-top box 116, a contact may be able to enter a topic for discussion about media content being displayed to both set-top boxes 116 and 120. The chat interface for the set-top box 120, in particular, and other devices of the communications environment 100 may be governed based on pre-set user preferences. The user preferences may include rules, permissions, stipulations, and other preferences that manage the respective device. Based on the user preferences established by the user of the set-top box 120 for the contact or specifically for users of the set-top box 116, the determination of whether a contact is authorized to chat or communicate with set-top box 120 may be determined by the set-top box 120 itself, the social network 104, or the communications management system 106.

In one embodiment, the set-top box 120 may be operable to receive chat requests even in a sleep, hibernation, or stand-by mode. As a result, in response to receiving a chat or chat request, the set-top box 120 may power itself on (and additionally a display) and display a chat interface to the contact. The display interface 122 is a controller for sending control signals to the display 124. In one embodiment, the display interface 122 may be a Bluetooth remote control that commands the display to power on in response to receiving input from one or more contacts to tune to a particular channel. In another embodiment, the display interface may be an infrared remote control that may be utilized to power on the display 124 and other equipment that may be required to view content on the display 124. For example, the display 124 may also require a receiver, sound processing system or other equipment be powered on to output media content to the display 124.

The display interface 122 may be configured to communicate with any number, type, configuration, and brand of media devices. The display interface 122 may be automatically programmable or may provide a user interface on the display interface 122 itself or a graphical user interface displayed to the set-top box 120 or display 124 that allows a user to specify the make, model, frequency and any other information that allows the display interface 122 to interact with the media system, which includes the display 124. The display interface 122 may also be configured to activate an integrated video camera for a video interface or increase or decrease the volume to a default or specified level. In one embodiment, a user that is traveling may temporarily register information with a set-top box in a hotel, office, or other accommodation enabling personal and work communications in a more efficient manner.

Figure 2:
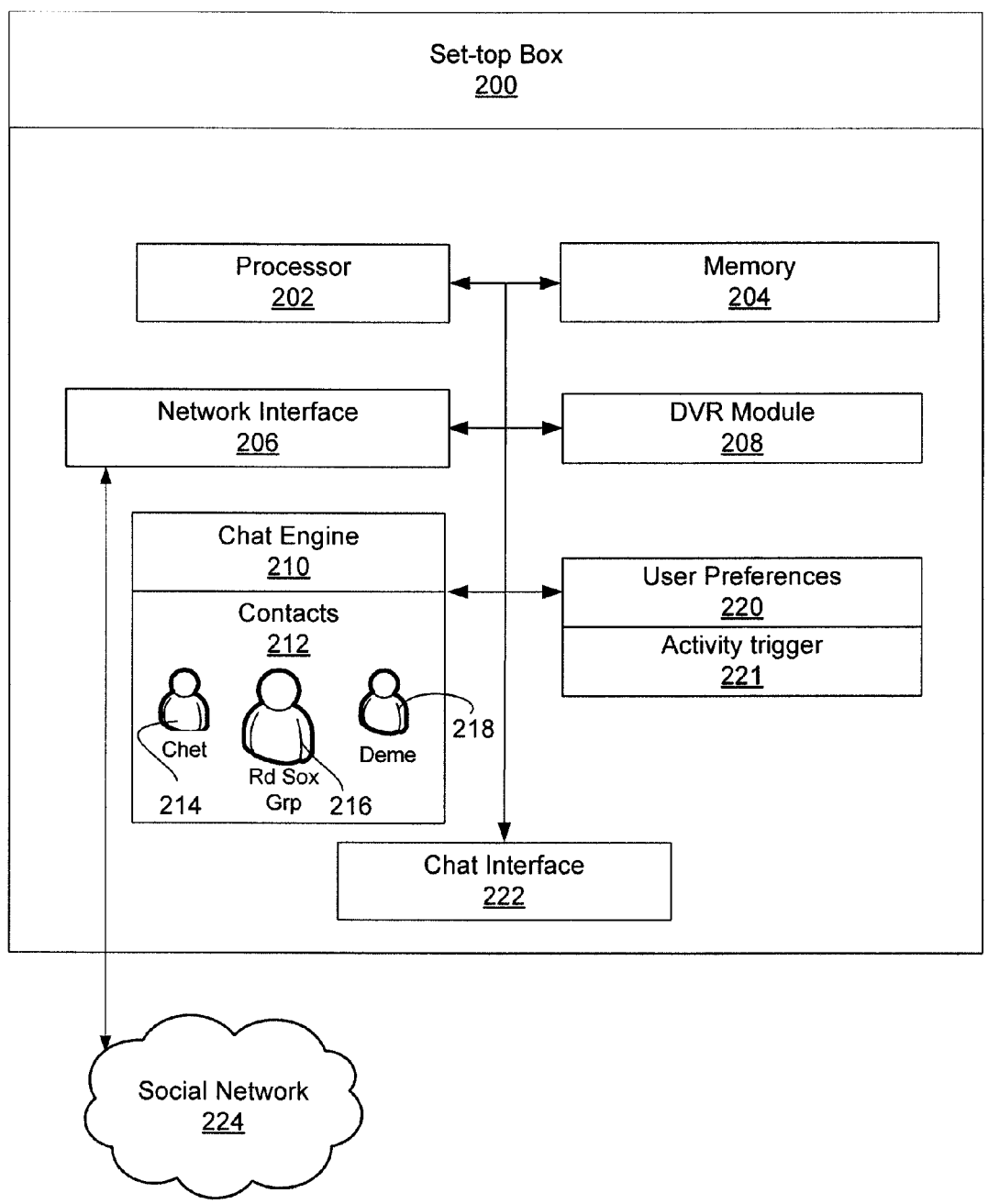
FIG. 2 is a block diagram of a set-top box in accordance with an illustrative embodiment.

FIG. 2 is a block diagram of a set-top box in accordance with an illustrative embodiment. FIG. 2 illustrates an embodiment of a set-top box 200. The set-top box 200 is a particular implementation of the set-top box 120 of FIG. 1. The set-top box may include any number of computing and telecommunications components, devices or elements, which may include busses, motherboards, circuits, ports, interfaces, cards, converters, adapters, connections, transceivers, displays, antennas, and other similar components. In one embodiment, the set-top box 200 may include a processor 202, a memory 204, a network interface 206, DVR module 208, chat engine 210, contacts 212, contacts 214, 216, and 218, user preferences 220, activity trigger 221, and chat interface 222. The set-top box 200 may communicate with a social network 224.

The elements of the set-top box 200 may be implemented entirely in hardware. In another embodiment, the chat engine 210 and other elements may be software modules that are stored in the memory 204 for execution by the processor 202. Alternatively, the set-top box 200 may be a specialized computing and communications device including a combination of hardware, software and firmware elements that perform the processes, features and other described elements of the illustrative embodiments.

The processor 202 is circuitry or logic enabled to control execution of a set of instructions. The processor 202 may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor 202 may be a single chip or may be integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory 204 may use any type of volatile or non-volatile storage techniques and mediums. The memory 204 may represent the PVR or DVR of the set-top box 200 storing media content, viewing information, user preferences, and other data. The memory 204 may be utilized to upload and download viewing information to multiple social networks and associated contacts based on the user preferences.

The set-top box 200 or the processor 202 may be a specialized computing and communications device programmed to perform the specific functions herein described. More specifically, the set-top box 200 is specially programmed to perform the instructions as described for the subsequently described hardware or software elements. The network interface 206 is an interface for communicating with a number of communications service providers, networks, users, systems, devices, entities and other parties. The network interface 206 may include any number of ports, communications lines or connections, or other elements. For example, the network interface 206 may interact with a portal for communicating with communications networks and service providers to ensure that a dedicated connection is available for chatting through social networks and viewing media content. A portal may be a web site that functions as a central point of access to information on the Internet or an intranet. The portal may be accessed from any computing or communications system or device enabled to communicate through a network connection.

The DVR module 208 includes recording and scheduling elements for processing and recording media content, viewing information, text, and data to the set-top box. For example, the DVR module 208 may include a hard disk memory, recording software, visual interface and other similar elements. In one embodiment, DVR utilization information and statistics may be communicated to one or more social networks. For example, in response to a user selecting to record movie shows those selections may be communicated to contacts authorized to receive such information. In another embodiment, the DVR module 208 may archive a record or history of all user or contact activities from the social networks. The history may include a history of chats performed through the set-top box or through specified social networks.

The chat engine 210 is logic that manages communications with the contacts 212 and other parties based on the user preferences. The chat engine 210 may manage control and display of the chat interface 222 to the user. In one embodiment, the control logic may be digital logic, an application specific integrated circuit, field programmable gate array (FPGA), or chipset operable to govern the user preferences 220 and all or portions of the set-top box 200.

In one embodiment, the chat engine 210 may include an interface for controlling a display connected to the set-top box 200 through wired or wireless connections. For example, the chat engine 210 may allow the set-top box 200 and the display to be activated in response to receiving an urgent chat.

The chat interface 222 is an interface for enabling chat communications or sessions with one or more contacts, social networks, parties, devices, or systems. For example, the chat interface may allow a user to communicate and receive information, files, notifications, data, updates, posts, status information, requests, indicators, details, and other information from the user. The chat interface 222 may be a user interface that includes controls of the set-top box 200 as well as an interface to a remote control or other communications device that may be utilized to control the set-top box 200.

The social network 224 is a particular implementation of the social network 104 of FIG. 1. The social network 224 represents one or more social networking sites that the user utilizes. In one embodiment, the chat engine 210 may allow the user to automatically or manually log in to the social network 224 through the set-top box 200. For example, the chat engine 210 may register with the social network 224 utilizing a hardware or software key, such as a MAC address, IP address, set-top box name or identifier, or other key. As a result, the set-top box 200 may enable standard social networking communications.

The contacts 212 may include any number of contacts of the user available through different social networks. For example, contact 214 may be a brother of the user available only through Facebook. Contact 216 may be a group contact for following Red Sox games, news, films, press releases and other related comment that is available through both Twitter and Yahoo Groups.

The activity trigger 221 is detection logic for detecting events, conditions, and factors occurring at the set-top box 200 or social network 224. In one embodiment, the activity trigger 221 may activate the chat interface 222 for interfacing with a user. The activity trigger 221 may be activated based on activity by the user, media content activity, or activity by any number of contacts. In one embodiment, the user preferences 220 may store rules, logic, settings, and other information for configuring the chat interface 222 and implementing chatting between the user and the contacts 212. For example, the user preferences may set parameters, conditions, and other factors utilized by the activity trigger 221.

Figure 3:
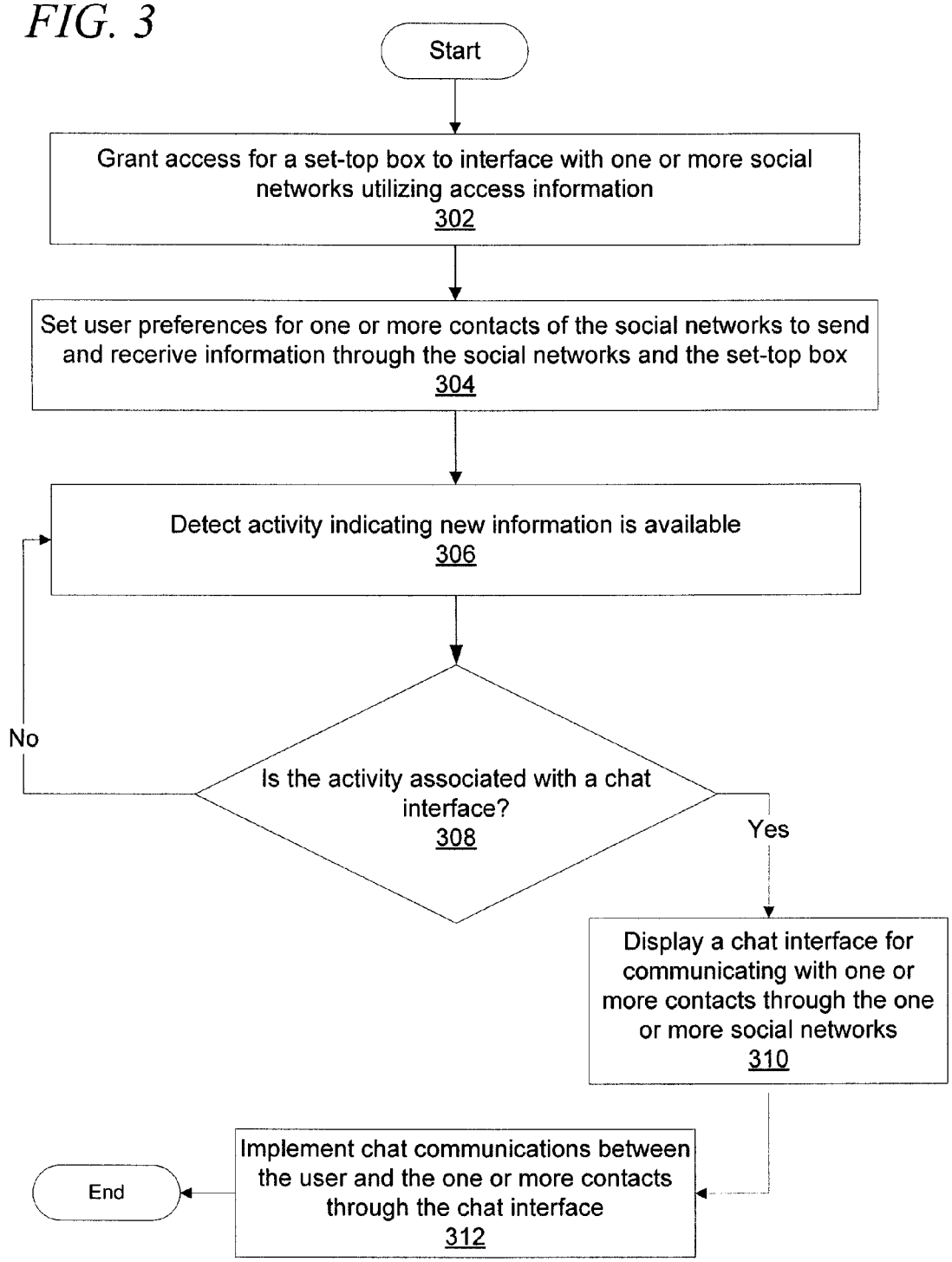
FIG. 3 is a flowchart of a process for displaying a chat interface in accordance with an illustrative embodiment.

FIG. 3 is a flowchart of a process for displaying a chat interface in accordance with an illustrative embodiment. The process of FIG. 3 may be implemented by a set-top box connected to or in communication with a display, such as a television and one or more network connections. The process may begin by granting access for a set-top box to interface with one or more social networks utilizing access information (step 302). In one embodiment, a chat application or interface may be utilized to specify the access information. The access information may include account information associated with one or more users that may perform communications originating from the set-top box. The access information may include one or more social networks, websites, groups or forums to which the user subscribes or otherwise interacts to be associated with set-top box. The access information may also include user names, passwords, verification codes, hardware keys, software keys, or other similar elements.

Next, the set-top box establishes user preferences for one or more contacts of the social network to send and receive information through the social networks and the set-top box (step 304). The user preferences may establish any number of preferences, permissions, rules, and logic for governing chat communications originating from or received by the set-top box. The user preferences may include time of day preferences that specify when the user is and is not available to chat. The user preferences may include status information allowing the user to establish whether he or she is available to chat. The status information may also be linked with specific programming. For example, when watching programming linked with the history channel, the user may set the set-top box to preclude chatting. The user preferences may also establish viewing activity and information available to all or some of the contacts. Each individual contact, group, or social network may have specific user preferences. For example, the set-top box may display a user interface that allows a user to utilize check boxes, indicators, fields, drop down lists, or other interactive elements to select the user preferences.

Next, the set-top box detects an activity indicating new information is available (step 306). The activity may be media content selections by the user or by one or more contacts of the user. In another embodiment, the activity may be open requests. For example, a contact in a group devoted to watching Red Sox games may have posted a request asking if anyone wanted to watch the game at the same time. The request may be selected through a social networking site or the set-top box may utilize the chat engine to determine the contacts intentions based on one or more posts or updates through any of the social networks.

The set-top box determines whether the activity is associated with a chat interface (step 308). In one embodiment the determination of step 308 may be automatically performed based on the user preferences, historical actions or trends taken by the user, or based on logic. For example, the user preferences may specify that a chat interface is initiated and displayed through the set-top box any time the brother of the user (that is also a contact) begins to watch a specified television program. The set-top box may also determine that almost every time the user watches a specific reality television show she initiates chats with three different parties, as a result, incoming chats from those individuals may be automatically allowed or the chat interface may have segments devoted to chatting with each of them collectively or individually. If the activity is not associated with a chat interface, the set-top box returns to detect activity indicating new information is available (step 306).

If the activity is associated with a chat interface in step 308, the set-top box displays a chat interface for communicating with one or more contacts through the one or more social networks (step 310). The chat interface may utilize a separate pop-up window, dedicated channel, picture-in-picture, or dedicated portion of the screen. In one embodiment, the picture size for the media content may be reduced, moved, or resized to accommodate the chat interface. For example, the chat interface may be semi-translucent so that the user may still watch the media content while chatting with the specified contacts.

Next, the set-top box implements chat communications between the user and the one or more contacts through the chat interface (step 312). The chat session may be implemented until terminated by either party or based on other user input.

Figure 4:
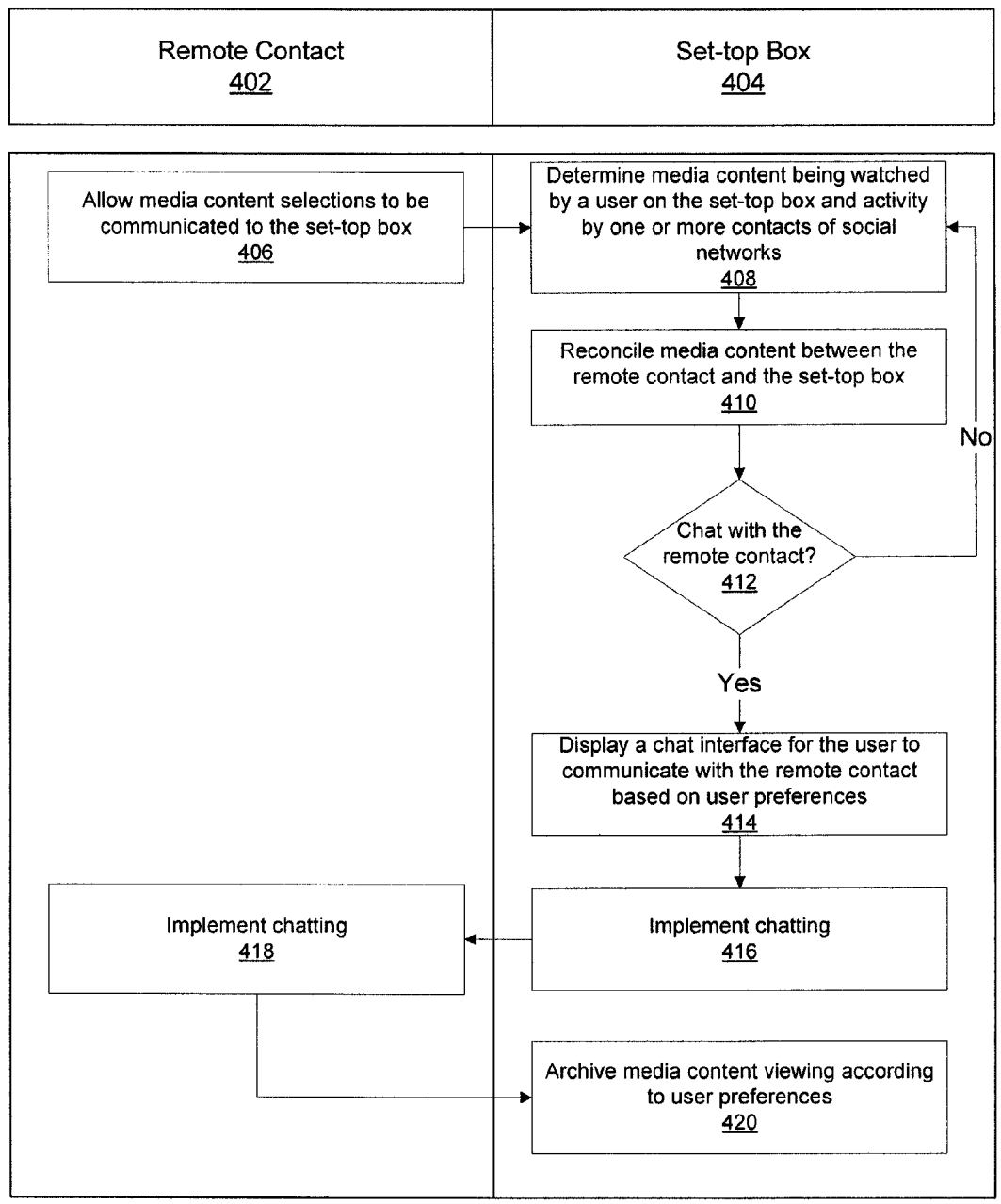
FIG. 4 is a flowchart of a process for implementing chats between a set-top box and one or more social networks in accordance with an illustrative embodiment.

FIG. 4 is a flowchart of a process for implementing chats between a set-top box and one or more social networks in accordance with an illustrative embodiment. The process of FIG. 4 may be implemented by a remote contact 402 and a set-top box 404. The remote contact 402 may utilize a set-top box, wireless device, laptop, personal computer or other computing or communications device to chat and otherwise communicate with the set-top box 404. For example, the remote contact 402 may represent a family member of the user of the set-top box 404 that may be utilizing a cell phone and a corresponding Twitter application to chat with the user. Alternatively, the remote contact 402 may represent a contact of the user utilizing a secondary set-top box to chat with the user through Facebook.

The process of FIG. 4 may begin with the remote contact 402 allowing media content selections to be communicated to the set-top box (step 406). The remote contact 402 as well as the set-top box 404 may receive user preferences that indicate permission, rules and other communications factors that govern the chat feature and communications between the remote contact 402 and the set-top box 404. For example, the remote contact 402 may only allow family members to see media content selections made by the user. The media content may be viewed or accessed on any number of wireless or wired devices as previously described.

Next, the set-top box 404 determines media content being watched by a user on the set-top box 404 and activity by one or more contacts on social networks (step 408). As previously described, the user of the set-top box 404 may have previously established user preferences governing when media content selections may be shared with the remote contact 402. The activity of step 408 may be media content selection by the remote contact 402 based on authorization or permission as illustrated in step 406.

Next, the set-top box 404 reconciles media content between the remote contact 402 and the set-top box 404 (step 410). The media content may be reconciled by determining whether the set-top box 404 and the remote contact 402 has access to the media content being viewed by the respective party. During step 410, the set-top box 404 may communicate with a content reconciler, such as a server. The content reconciler may be available through a communications network or may access a local or remote database (in the set-top box) to determine the channel or frequency the media content is available on and the time period in the event the remote contact 402 and the set-top box 404 are served by different content providers or are in different time zones. This application incorporates by reference utility application Ser. No. 12/499,457, filed on Jul. 8, 2009 entitled SYSTEM AND METHOD FOR A MEDIA CONTENT RECONCILER.

By reconciling the media content, both the set-top box 404, the corresponding user, and the remote contact 402 may be able to determine whether the media content being viewed by the respective parties is available and if so on what channel and at what time. For example, the set-top box 404 may display a list of favorite television programs that are regularly viewed by the remote contact 402 as well as the corresponding channels and times that those programs are accessible through the set-top box 404 and corresponding media content provider utilized by the user. For example, during step 410 an interactive link may be displayed that when selected automatically tunes or changes the channel to the media content being viewed by the remote contact 402.

Next, the set-top box 404 determines whether to chat with the remote contact 402 (step 412). The determination of step 412 may be implemented based on the activity determined or monitored in step 408. For example, in response to the remote contact 402 and the user watching the same program simultaneously, the set-top box 404 may automatically determine that the user may want to chat with the remote contact 402. In another embodiment the set-top box 404 may prompt the user to initiate or allow a chat session between the remote contact 402 and the set-top box 404. As a result, the set-top box 404 may initiate a chat communication or may accept a request or initial message as part of a chat session automatically or based on manual selections to allow the communication at that time. If the set-top box 404 determines not to chat with the remote contact 402, the set-top box 404 determines media content being watched by a user on the set-top box and activity by one or more contacts of social networks (step 408). If the set-top box 404 determines to chat with the remote contact 402 during step 412, the set-top box 404 displays a chat interface for the user to communicate with the remote contact 402 based on user preferences (step 414).

The chat interface may encompass all or a portion of the display in communication with the set-top box 404. In one embodiment, the chat interface may be implemented through the picture-in-picture feature of a television for allowing the user to chat while still watching the primary media content. The user preferences may establish parameters for the chat interface as well as implement any number of limitations or parameters. For example, an administrator of the set-top box 404 may specify that children users are not able to chat with other parties unless they provide a password or are otherwise authenticated. As a result, any number of user profiles may be utilized with the set-top box 404 for interfacing with different social networks and may correspondingly have individual user preferences and be controlled by administrative preferences by one or more administrators or managers of the set-top box 404.

Next, the set-top box 404 and the remote contact 402 implement chatting (step 416 and 418). During the chatting, the users may send text to one another, files, audio or video messages that may be received and or recorded by the set-top box or a remote control, video camera, microphone system or other peripheral interfaces to the set-top box 404.

Next, the set-top box 404 archives media content viewing according to user preferences (step 420). The media content viewing preferences may be stored locally or in a remote location for access by the user and contacts associated with the user.

Figure 5:
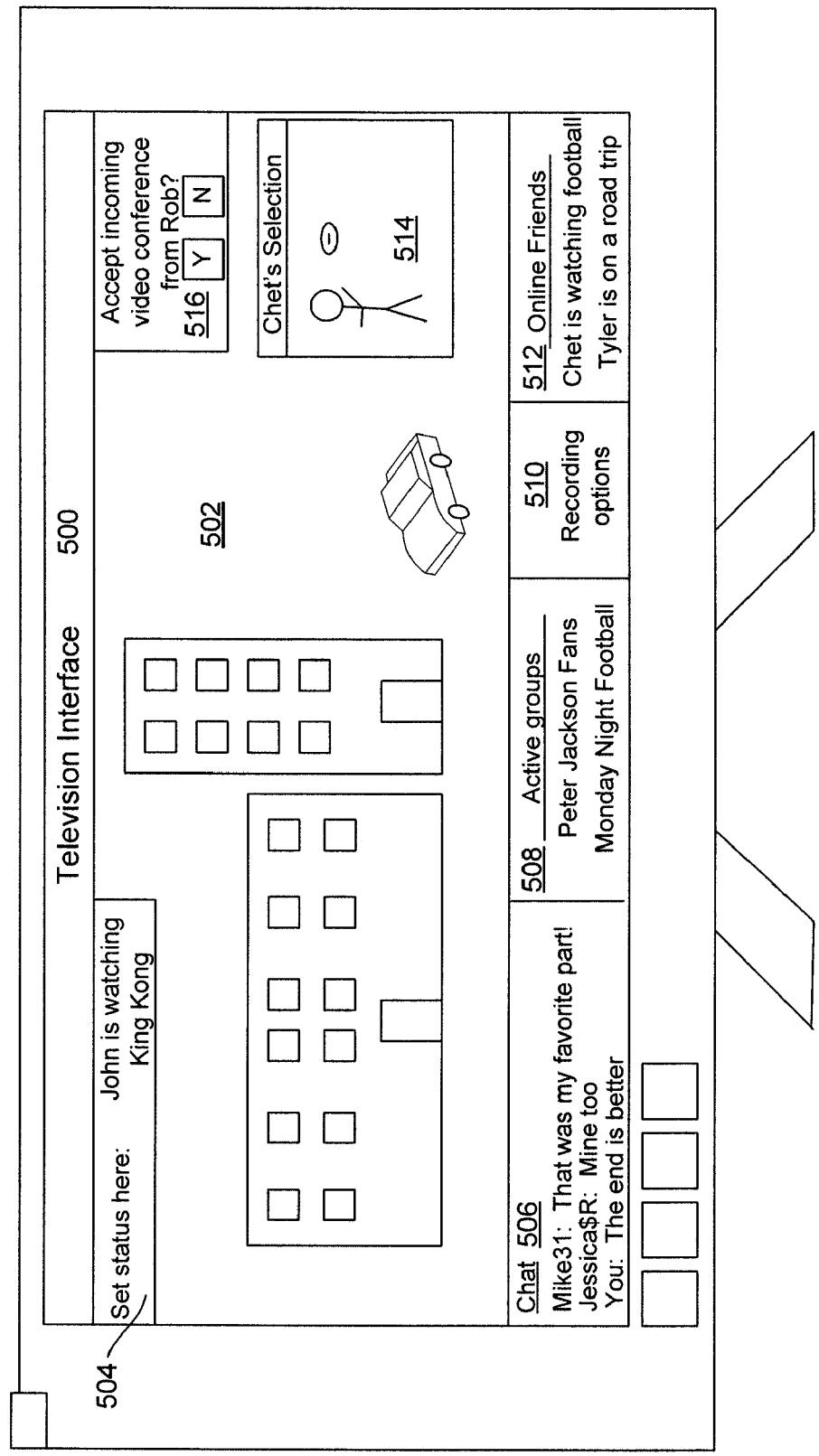
FIG. 5 is a pictorial representation of a chat interface in accordance with an illustrative embodiment.

FIG. 5 is a pictorial representation of a chat interface in accordance with an illustrative embodiment. As previously described a chat interface 500 may be a graphical user interface menu, or other interface displayable to a television or other suitable display. A user may interact with the chat interface 500 through the use of an infrared, Bluetooth, WiFi, or RF television remote or a custom remote equipped with specific communication options, such as a QWERTY keyboard. The interface may also be configured to respond to voice commands. The chat interface 500 may allow users to view media content including television programs, movies, and other content while offering the expanded networking capabilities described herein. The graphical user interface may display any number of interactive elements including icons, fields, drop down menus, lists, check boxes, and other interactive elements. The chat interface 500 may include sections 502, 504, 506, 508, 510, 512, 514, and 516.

Section 502 may display the primary media content. For example, the user may be watching a pay-per-view program that is being formatted for display by the set-top box. All or portions of section 502 may be resized, split or altered to generate the sections 504, 506, 508, 510, 512, 514, and 516.

Section 504 may display the status of the user according to user preferences. A user may set status information to update automatically according to the current viewing selection. For example, a user may set section 504 to detail the current programming selection the user is viewing. The user may also limit the number of friends or contacts that receive these status updates through the user preferences. A user may set section 504 to be automatically sent only to those who are viewing the same program or who have joined a certain viewing group or who have similar programming preferences, recorded as viewing statistics. For example, a user may join the group, "Fans of The Office," and select status information to be viewable to anyone with the same preferences, even those who have not been added as friends or contacts.

Section 504 may also be linked to DVR capabilities and send out status updates of DVR activity. For example, a user may set their status to automatically display their most recent DVR recording, such as, "John just recorded The Phantom of the Opera." A user may also add a planned viewing time for the recorded selection, "John recorded the Phantom and will watch it Tuesday at 8." As a result, a calendar of recording and watching times may be available to one or more contacts. Additionally, the user may invite the contact to view the content simultaneously through an informal invitation through a chat communication or through an electronic invitation message. Section 504 may also be configured to automatically display when a favorite program is being recorded and watched. A user may also display part of their viewing preferences as their status, "John is watching a recording of Heroes-viewed 44 times."

Section 506 may be used to send and receive text chats. In one embodiment, the chat interface may be automatically activated when a user logs on. In another embodiment, an affirmative selection may be required to activate chat windows or partitions of the chat interface. The chat feature may also be configured to only display certain contacts or contacts associated with ongoing conditions or parameters of the set-top box. Possible examples may include only friends belonging to the group "college buddies," or "Fans of 24," or the chat interface may only allow chats with users simultaneously watching the same media content. Section 516 may allow the user to configure the chat interface to send a prompt to enter video conferencing when authorized contacts also activate chat mode.

Section 508 may be used to display active user groups or add new groups. Section 508 may provide prompts for groups, forums, or sessions a user may join that are automatically selected according to user preferences. For example, a viewing statistics of the user may show that the user is a fan of "The Office", a local group may be entitled, "Fans of The Office in Texas," and the user may receive a prompt to join this group. A user may also set users preferences to automatically join groups when an invitation is received and/or send invitations to their friends to join the same group.

Section 510 may provide a wide range of advanced recording options. A user may be able to record clips of media content (all or a portion) being viewed, assign titles, and post the media content for others to view. For example, the user or contacts may record sections of media content allowed based on permissions or legal requirements of the content provider. Many content providers may allow such clipping as a way of enabling buzz or Internet marketing to build. The portions of media content may be posted to a social network or sent directly to one or more contacts. The recording options of section 510 may also allow a user to specify programs or content to be recorded from a remote location on an associated home DVR. A user may display on a home page of one or more social networks currently recorded content or a list of upcoming recording selections. A user may also receive requests from friends of what content to record. For example, section 510 may indicate that a viewing status indicates that a contact has viewed all episodes of season two of Lost except for episode five. The user may automatically be informed of the status when the desired episode is airing or the contact may manually send a request for the content to be recorded. The user may also create a group of friends for the purpose of sharing DVR storage space. A user may configure security settings of the set-top box to allow a friend to select and record content on the DVR as well as stream the media content to a designated device. A user may also be able to access DVRs of contacts to record content if the user's DVR currently has no storage space. Users may then use the chat interface to the social network to access and view content recorded on multiple DVRs. A user may also use the DVR to store and access text messages, chats, or voice messages.

Section 512 may display contacts that are online. Section 512 may also display friends and their current status and also what type of chat they are signed in for. For example, a graphic could display that a friend is available for video chat and another may only be available for text chats. A user could also display if they were at home or accessing their profile from a remote location.

Section 514 may be used to view a plurality of content at once. For example, a user may be watching a movie but also want to view a football game that a contact is currently watching. The user may select a picture-in-picture mode or split the user interface 100 to view different media content simultaneously. Section 516 may be utilized by a user to receive prompts about incoming invitations, statistics, status updates, stored voice or text messages, pictures, and any other interactive content.

FIG. 6 is a pictorial representation of a user interface 600 for setting user preferences in accordance with an illustrative embodiment. The user interface 600 is one example of an interface for setting user preferences, contacts, and permissions. The user interface 600 may include sections 602, 604, and 606.

Section 602 may require a user to enter a username, account number, nickname, password, or other identifiers for authenticating the user. Section 604 may allow a user to specify chat permissions for various contacts. In one embodiment, the user may specify permissions for each of a number of contacts available through any number of social networks.

Section 606 may further include user preferences controlling implementation of the chat interface. In one embodiment, the user preference may specify the configuration of the chat interface, when activated, restrictions on chatting, and other similar preferences.

Although particular embodiments of the present invention have been explained in detail, it should be understood that various changes, substitutions, and alterations can be made to such embodiments without departing from the scope of the present invention as defined by the following claims.

What is claimed:

1. A method for chatting between a set-top box and one or more social networks, the method comprising:
    associating one or more social networks with a set-top box;
    setting user preferences for communications with one or more contacts included in the one or more social networks;
    displaying a chat interface to a user on a display associated with the set-top box in response to the user preferences; and
    communicating with the one or more contacts using the chat interface;
    configuring the set-top box to receive chat requests in at least one of sleep, hibernation, and stand-by mode; and
    in response to the set-top box receiving a chat request in at least one of the sleep, hibernation, and standby, automatically powering on the set-top box and the display, and displaying the chat interface.

2. The method according to claim 1, wherein the associating further comprises:
    receiving account information for communicating through the social network via the set-top box.

3. The method according to claim 1, wherein the user preferences establish when, how, and what the one or more contacts are authorized to communicate with the user.

4. The method according to claim 1, further comprising:
receiving status updates from the one or more contacts indicating media content each of the one or more contacts is watching, wherein the displaying is performed in response to activity detected by the set-top box, wherein the activity is the user tuning to a channel.

5. The method according to claim 1, wherein the communicating is a status update of media content being viewed by the user.

6. The method according to claim 5, wherein the communicating is performed based on the one or more contacts that have an interest in the media content.

7. The method according to claim 1, wherein the chat interface for each of the one or more social networks is activated by tuning the set-top box to a dedicated channel.

8. A set-top box for chatting through a social network, the set-top box comprising:
a network interface enabling a user to communicate with one or more contacts through one or more social networks through a communications connection; and
a chat engine in communication with the network interface, the chat engine operable to manage communications with the one or more contacts based on user preferences, the chat engine being operable to display a chat interface to the user,
an activity trigger in communication with the chat engine, the activity trigger operable to activate the chat interface to display a communication from one of the one or more contacts, the activity trigger further configured to automatically power on the set top box and a display, and display the chat interface in response to the set-top box receiving a chat request while in at least one of a sleep, hibernation, and standby mode.

9. The set-top box according to claim 8, wherein the chat interface for each of the one or more social networks is activated by tuning the set-top box to a dedicated channel, the network interface establishes a dedicated connection to the one or more social networks.

10. The set-top box according to claim 8, wherein the user preferences specify a status established by the user, time of day preferences that specify when the user is available to chat.

11. The set-top box according to claim 10, wherein the status is established in response to media content being displayed to the display by the set-top box.

12. A set-top box comprising:
a processor for executing a set of instructions; and
a memory for storing the set of instructions, wherein the set of instructions are configured to:
associate one or more social networks with a set-top box;
set user preferences for communications with one or more contacts included in the one or more social networks;
display a chat interface to a user on a display associated with the set-top box;
automatically power on the set top box and the display, and display the chat interface in response to the set-top box receiving a chat request while in at least one of a sleep, hibernation, and standby mode; and
communicate with the one or more contacts using the chat interface.

13. The set-top box according to claim 12, wherein the chat interface is semi-translucent and allows communications with a plurality of contacts simultaneously.

14. The set-top box according to claim 12, wherein the chat interface for each of the one or more social networks is activated by tuning the set-top box to a dedicated channel.

15. The set-top box according to claim 12, wherein the set of instructions:
permit communications through the chat interface in response to a determination of the user utilizing the set-top box;
wherein the user preferences establish when, how, and what the one or more contacts are authorized to communicate with the user.

* * * * *